(12) United States Patent
Scattini

(10) Patent No.: US 11,162,595 B2
(45) Date of Patent: Nov. 2, 2021

(54) SEALING ASSEMBLY FOR BALL VALVES AND BALL VALVE COMPRISING SUCH A SEALING ASSEMBLY

(71) Applicant: Gasket International S.R.L., Cividino di Castelli Calepio (IT)

(72) Inventor: Roberto Scattini, Credaro (IT)

(73) Assignee: GASKET INTERNATIONAL S.R.L., Cividino di Castelli Calepio (IT)

( * ) Notice: Subject to any disclaimer, the term of this patent is extended or adjusted under 35 U.S.C. 154(b) by 631 days.

(21) Appl. No.: 16/076,095

(22) PCT Filed: Feb. 20, 2017

(86) PCT No.: PCT/IB2017/050946
§ 371 (c)(1),
(2) Date: Aug. 7, 2018

(87) PCT Pub. No.: WO2017/141221
PCT Pub. Date: Aug. 24, 2017

(65) Prior Publication Data
US 2021/0190216 A1  Jun. 24, 2021

(30) Foreign Application Priority Data

Feb. 18, 2016 (IT) .......................... 102016000016879
Feb. 18, 2016 (IT) .......................... 102016000016922

(51) Int. Cl.
*F16K 5/06* (2006.01)
*F16K 5/20* (2006.01)

(52) U.S. Cl.
CPC ............ *F16K 5/0663* (2013.01); *F16K 5/205* (2013.01); *F16K 5/06* (2013.01)

(58) Field of Classification Search
CPC .......... F16K 5/0663; F16K 5/025; F16K 5/06
See application file for complete search history.

(56) References Cited

U.S. PATENT DOCUMENTS 3,266,769 A * 8/1966 Shand ..................... F16K 5/207
                                                            251/172
4,023,773 A    5/1977 Wise
4,511,150 A * 4/1985 Seguenot ............... F16K 5/205
                                                            251/171

(Continued)

FOREIGN PATENT DOCUMENTS

DE    2908178    9/1980
DE    2937435    4/1981

(Continued)

*Primary Examiner* — Kevin R Barss
(74) *Attorney, Agent, or Firm* — Stetina Brunda Garred and Brucker

(57) ABSTRACT

The present invention relates to sealing valves used in the petroleum and gas extraction industry, in particular but not exclusively, to medium- or high-pressure ball valves. In particular, the present invention relates to a sealing assembly (101, 102) for ball valves (1), and to a ball valve comprising such an improved sealing assembly. The sealing assembly ensures excellent sealing performance at low and high pressures by exclusively using a thermoplastic material sealing element (31), thus completely eliminating the drawbacks which afflict the sealing system of known type, in particular in relation to the reliability of the sealing elements made of elastomeric material.

17 Claims, 12 Drawing Sheets

(56) References Cited

U.S. PATENT DOCUMENTS

| | | | | |
|---|---|---|---|---|
| 5,267,722 A | * | 12/1993 | Coulter | F16K 5/0673 251/315.01 |
| 5,419,532 A | * | 5/1995 | Fan | F16K 5/0673 251/315.08 |
| 2016/0146355 A1 | * | 5/2016 | Anderson | F16K 41/026 251/315.1 |

FOREIGN PATENT DOCUMENTS

| | | | | |
|---|---|---|---|---|
| DE | 19604209 | | 8/1997 | |
| DE | 10058530 | | 5/2002 | |
| GB | 2135431 | | 8/1984 | |
| WO | WO2005036036 | | 4/2005 | |
| WO | WO2011033536 | | 3/2011 | |
| WO | WO-2011033536 A1 | * | 3/2011 | F16K 5/0673 |
| WO | WO2013021238 | | 2/2013 | |

* cited by examiner

SEALING ASSEMBLY FOR BALL VALVES AND BALL VALVE COMPRISING SUCH A SEALING ASSEMBLY

CROSS REFERENCE TO RELATED APPLICATION(S)

The present application claims priority to PCT International Application No. PCT/IB2017/050946 filed on Feb. 20, 2017, which application claims priority to Italian Patent Application Nos. 102106000016879 and 102016000016922 both filed Feb. 18, 2016, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to sealing valves used in the petroleum and natural gas extraction industry, in particular but not exclusively ball valves for applications in which the pressure is comprised in a range between 0 and 450 Bar. In particular, the present invention relates to an improved sealing assembly for ball valves, preferably for valves of the "trunnion" type, and to a ball valve comprising such an improved sealing assembly.

BACKGROUND ART

In the petroleum and natural gas extraction industry field, ball valves are used to achieve the sealing of a fluid (petroleum or natural gas) conveyed in a pipe. Ball valves, as known, comprise a valve body, a ball, which has the function of shutter to obstruct the fluid passage, and a seat coupled to the ball to achieve the fluid sealing. At least one sealing element acts between the seat and the ball of the valve to ensure the sealing of the valve and concurrently to be adapted to allow the relative movement between seat and ball in order to open and close the valve itself. The valve body and the seat are both internally hollow to define a passage for the fluid between an inlet section and an outlet section. When the valve is in the closed configuration, the ball obstructs the fluid passage between the inlet and the outlet section. In open configuration, the ball defines a gap which puts the sections into communication. In "trunnion" type valves, widely known in the field, the movement of the ball is supported by two opposite pins defining a rotation axis. The ball thus maintains a single degree of freedom in rotation with respect to the valve body. Such a rotation is permitted by means of an external actuator.

The working pressures for which these valves are designed are comprised in a rather wide range, and vary according to the type of system for which they were intended. Many solutions have been developed in order to comply with the specifications of each system. Each solution includes a valve with specific constructional features which make it suitable for a respective application. Valves named "Single Piston Effect" (SPE) and "Double Piston Effect" (DPE) valves are known in the field.

In a SPE valve, like in a DPE valve, a first seat and a second seat are included, respectively upstream and downstream of the ball with respect to the flow direction. In a SPE valve, the sealing of the valve is performed solely by the first seat, generally the one upstream of the ball with respect to the fluid flow. If the sealing of the first seat is compromised for any reason, in a SPE valve the second seat, i.e. the one downstream of the valve, must not provide sealing against the ball. On the contrary, the second seat is required to let the working fluid through, particularly if this is gas. This is in order to prevent the accumulation of pressurized fluid in the valve, which is potentially very dangerous. The same behavior is required also when the ball is turned to the closed configuration. In this case, the pressure inside the ball gap must be discharged downstream of the ball itself. According to the current standards, in case of a SPE valve, the necessary pressure for achieving the automatic opening ("self relieving") of the seat must be either lower than or equal to 10% of the working pressure.

On the contrary, in DPE type valves, if the first seat, i.e. the one upstream of the ball with respect to the flow direction, does not provide the sealing for any reason, the second seat, i.e. the one downstream of the ball, must provide the sealing. In order to obtain this result, as known in the prior art, the seat is configured so that the fluid is interposed between the seat and the closing of the valve body causing the thrust of the seat against the ball, so as to apply the sealing. In other words, in DPE type valves, the second seat has the function of hermetically closing the valve.

The valve types indicated above, defined as a function of the obtained technical effect or of the operating behavior, are thus known in the field, and different technical solutions can be found within such types. Substantially, in the current art, each valve is designed for its destination application by designing a specific geometry of the sealing assembly, meaning the whole of seat and sealing elements. Substantially, in order to manufacture a SPE type valve or alternatively a DPE type valve, the manufacturer must devise a specific configuration of the sealing assembly.

The solutions of known type are not functionally versatile. Indeed, currently, a seat designed for a SPE valve cannot be used in a DPE valve, and vice versa. Thus, the valve manufacturer must know the type of valve to be installed and must procure the specific components according to whether the valve must be of Single Piston Effect or a Double Piston Effect type. So, as known in the prior art, the manufacturer must make and have on stock the availability of two different sealing assemblies, one adapted to manufacture SPE type valves and one adapted to manufacture DPE valves.

In other words, interchangeable solutions are not known today on the market, which allow the manufacturer and others to make a single type of seat, thus reducing component volumes, in particular seats on stock, and also the user to modify the nature of a valve, e.g. passing from a Single Piston Effect to a Double Piston Effect or vice versa, simply by acting on the seat, without needing to modify the valve body and/or the closings in any way.

Numerous pipes may be provided in a system, each with specific flow rate and pressure conditions, provided with respective sealing valves. Which valve to apply to each pipe must be established in the step of designing and the actually included valve must be installed during the step of assembling. In addition to establishing the behavior required by the valve (DPE or SPE), the methods with which the sealing is achieved according to the operative conditions must be defined during the step of designing.

In particular, in the known solutions, seals with elastomer insert are used in applications in gas and hydraulic environment with low and high pressures. Such a sealing element, known in the prior art, generally consists of a rubber O-ring adapted to implement a hermetic closing between the seat and the ball. Such a rubber sealing element allows the sealing also in case of a surface ball finish which is free from faults, or which in all cases displays a given surface roughness. In other words, the rubber O-ring allows to obtain the sealing with low manufacturing costs because it is not necessary to exasperate the tolerances, the surface finish or the shape errors of the ball.

However, the use of the O-ring as sealing element has some drawbacks, the first of which is the risk of extrusion of the seal, i.e. in case of high working pressures, the O-ring itself is deformed and/or is partially expelled from its housing, with consequent failure cause by tearing. In such a condition, the valve cannot ensure the tightness of the sealing.

It is thus a limit of the valves having the rubber O-ring as the only sealing element the fact of not being reliable for high fluid or gas pressure valves, meaning values higher than 100 bars already as high pressures.

In order to improve the tightness of the valve even at higher fluid pressure values, solutions are known on the market which include an elastomeric ring having substantially triangular, more specifically delta-shaped cross section, named delta-ring, as sealing element. Examples of sealing obtained with delta-ring are described in patent applications WO 2013/02123238 and WO 2011/0343536 by the applicant.

This solution, although it improves the sealing at high temperatures, is neither entirely satisfactory in contrasting the aforesaid drawbacks (extrusion/tearing). Although, as mentioned, the sealing elements made of elastomeric material may offer good sealing at low pressure, they appear unsuitable to work at high pressures, having a poor resistance to mechanical fatigue. Furthermore, because of the deformity of the material of which they are made, they may be extruded from the housing in which they are accommodated. The elastomer deteriorates even more rapidly in aggressive environments, as occurs above all in the treatment of hydrocarbons in gaseous form.

By the side of these solutions, valves using thermoplastic material elements to achieve the seat-ball sealing are known in the field. Examples of materials used are PTFE (with various compounds), PA, PEEK, POM, PCTFE, and the like, very hard thermoplastic polymers. These sealing elements, or inserts, made of thermoplastic materials are typically inserted with interference in the respective housing contained on the valve seat. Therefore, the dimensional control of insert and seat is very important in the scope of designing these sealing systems. The use of clamping means for fixing the position of the sealing element in the corresponding housing is provided for in many cases.

With respect to the use of rubber O-rings or delta-rings, the thermoplastic sealing elements avoid the metal-to-metal contact between seat and ball also with high working pressures because they are less easily deformable than rubber. On the other hand, a drawback connected to the use of thermoplastic materials is the need to have very low machining tolerances and/or misalignments in the assembly of the valve components and a very low surface roughness of the ball which must therefore be subjected to surface finishing by lapping in order to ensure good sealing. At the same time, the sealing elements made of thermoplastic material, currently in use, are not adapted to implement good sealing at low pressure.

In the field, and in particular in the gas extraction industry field, the ball valves must operate on fluid in gaseous state, which may have low pressures or reach pressures the order of 450 bar or beyond. In order to allow both functions, some known solutions (also described in applications WO 2013/02123238 and WO 2011/0343536) use two sealing elements, one made of elastomeric material and other of thermoplastic material.

Thereby, at low pressures, sealing is ensured by the elastomeric material. At high pressures, sealing is predominantly allowed by the thermoplastic material sealing element. At the same time, the elastomeric material should have the function of compensating for the elastic deformations of the valve ball generated by high fluid working pressures. However, the elastomeric material undergoes major deformations during the opening operations at maximum pressure, which puts the seal in high stress conditions until causing failure by tearing. The problem is further accentuated in the presence of aggressive environment. Therefore, the solution which combines a thermoplastic sealing element with an elastomeric sealing element also has strong limits of reliability and durability. Furthermore, these solutions require works which are complex for manufacturing the housings intended to accommodate the sealing rings. In this regard, the delta-ring housing is very complex to be obtained, while the housing for the thermoplastic element requires less restrictive tolerances. The assembly operations of the sealing assembly with two combined elements (one elastomeric and the other thermoplastic) also appear particularly complex.

According to the considerations disclosed above, it is a main task of the present invention to provide an improved sealing assembly for a ball valve which allows to solve the drawbacks which afflict the sealing systems of type known in the prior art. Within the scope of this task, it is the object of the present invention to provide an assembly for industrial ball valves which allows to obtain an excellent sealing both at low and at high temperatures. It is another object of the present invention to provide a sealing assembly which requires simpler seat processing and assembly operations than those required by the traditional solutions.

It is yet another object to provide a sealing assembly which allows to improve the sealing in particular working conditions and in particular in gas or hydraulic environment which is subject to numerous and frequency opening and closing cycles at high pressure.

It is a further object of the present invention to provide a sealing assembly comprising a seat which is interchangeable, i.e. replaceable within the same valve body in order to modify the valve type, from SPE type valve to DPE type valve, and vice versa, without needing to modify or adapt the valve body in any manner.

It is a not last object of the present invention to provide a sealing assembly which is reliable and easy to be manufactured at competitive costs.

SUMMARY

The present invention thus relates to a sealing assembly for an industrial ball valve, wherein said valve comprises at least one valve body and a ball accommodated in said valve body. The sealing assembly according to the invention comprises at least one seat, insertable in the valve body, which develops about a central axis defining an axial cavity for the passage of a pressurized fluid. Such a seat comprises a first housing at a first front surface which faces towards the ball when the seat is installed in the valve body. Such a first housing comprises a closed bottom surface, which develops on a plane transversal to said central axis.

The sealing element further comprises a sealing element, made of thermoplastic material, to achieve the fluid sealing between the seat and the ball of the valve. Such a sealing element is ring-shaped and accommodated within the first housing. In particular, the assembly according to the invention is characterized in that the sealing element is accommodated with radial clearance in said first housing to float, with respect to the seat, along a direction parallel to the central axis when the seat is installed in the valve body and when the seat is internally crossed by the pressurized fluid.

The sealing assembly further comprises anti-extrusion means to avoid the extraction of the sealing element from said first housing during the step of opening said valve.

The sealing assembly according to the present invention allows to completely eliminate the elastomeric material insert, entrusting the sealing exclusively to a sealing element made of thermoplastic material, thus solving the problems related to wear and to the fatigue behaviors which afflict the sealing elements made of elastomeric material and obtaining a thermoplastic material sealing element with extremely high sealing levels. By means of the sealing assembly, an optimal sealing up to 420 bar of pressure may be achieved, thus reducing the problems of wear and fatigue deterioration. Indeed, as the pressure increases with the valve closed, the thrust of the sealing element against the ball, and thus of the sealing itself, increases. During the step of opening the valve, the pressure is reduced and therefore the force which pushes the sealing element against the ball is also reduced thus limiting the phenomena of wear and mechanical fatigue. At the same time, the possibility of relative movement of the sealing elements with respect to the seat, due to the fact that the sealing element floats with respect to the first seat, ensures the compensation for the elastic deformation of the ball due to the pressure of the fluid.

The sealing assembly according to the present invention ensures solidity and reliability in terms of deterioration and equivalent performance of the elastomeric insert at low pressures. At the same time, the presence of the thermoplastic sealing element further ensures a lower friction, and thus a lower valve opening torque value with respect to the solution with elastomeric seal. The sealing assembly according to the invention can be possibly applied also to PMSS (Primary Metal Secondary Soft) valves in which a metal-to-metal contact is provided between the front surface of the seat and the ball.

LIST OF FIGURES

Further features and advantages of the present invention will be more apparent from the following detailed description provided by way of non-limiting example and shown in the accompanying figures, in which.

The same numbers and letters in the figures refer to the same elements or components.

DETAILED DESCRIPTION OF THE INVENTION

Figure 1:
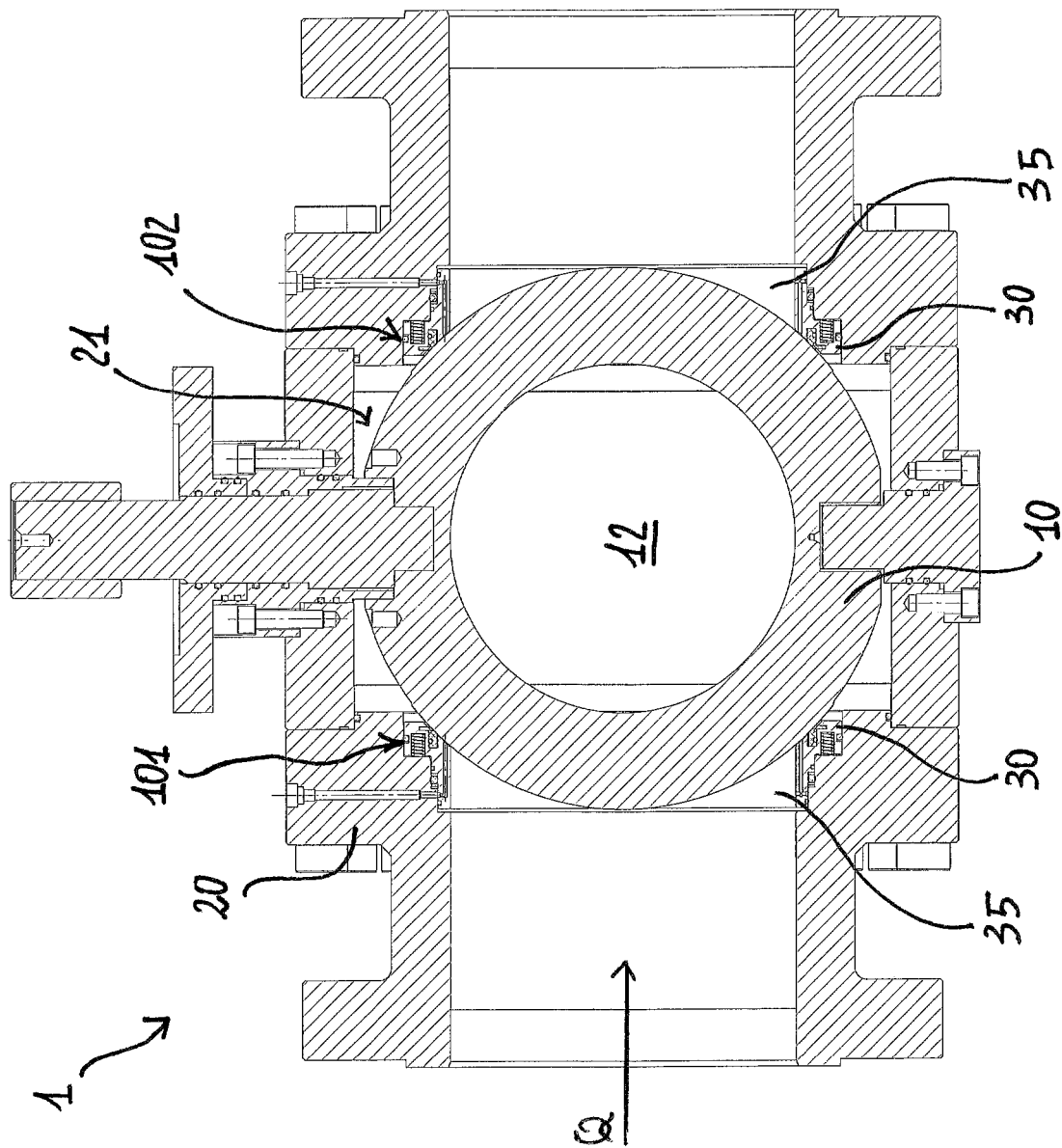
FIG. 1 shows a section view of a ball valve comprising two sealing systems according to the present invention which act respectively upstream and downstream of the ball.

With particular reference to FIG. 1, a valve 1 of the "trunnion" type is shown, comprising a sealing assembly according to the present invention. The valve 1 is intended to be installed on a fluid pipe and comprises a body 20 which defines a housing 21, in which an internally hollow ball 10 is accommodated, which is adapted to close the fluid flow Q and create a passage gap 12 for the flow itself, as known for valves of this type. The valve 1 shown comprises a first sealing assembly 101 and a second sealing assembly 102 operatively associated with the ball 10 to achieve the fluid sealing on opposite parts of the ball 10, respectively upstream and downstream of the fluid flow inside the valve. In particular, the two systems 101,102 achieve the sealing at least when the ball 10 is in closed condition. Hereinafter in this description, reference will be made to the first sealing assembly 101 which acts upstream of the ball 10, but the same considerations also apply to the sealing assembly 102 downstream.

The sealing assembly 101 according to the invention comprises a seat 30 which is installed in the valve body 20. The seat 30 develops as a revolution solid around a central axis A and comprises an axial cavity 35 for the passage of a pressurized fluid (liquid or gas). The central axis A identifies the fluid flow direction, when the seat 30 is inserted in the valve body 20 and the valve 1 is open. The direction of flow is obviously established by the conditions of the system in which the valve is inserted. With reference to the exploded view in FIG. 4, the seat 30 defines a first housing 31A defined at a first front surface 30A of the seat 30. Such a front surface 30A, like the first housing 31A, face towards said ball 10 when the seat 30 is installed in the valve body 20. The first housing 31A develops as a ring about the central axis A being defined by two coaxial cylindrical surfaces. The first housing 31A is further delimited by a bottom surface 310 which develops, preferably on a transversal plane substantially orthogonal to the central axis A. The bottom surface 310 is closed so that the first housing 31A is open only on the side of the front surface 30A of the seat 30.

Figure 2:
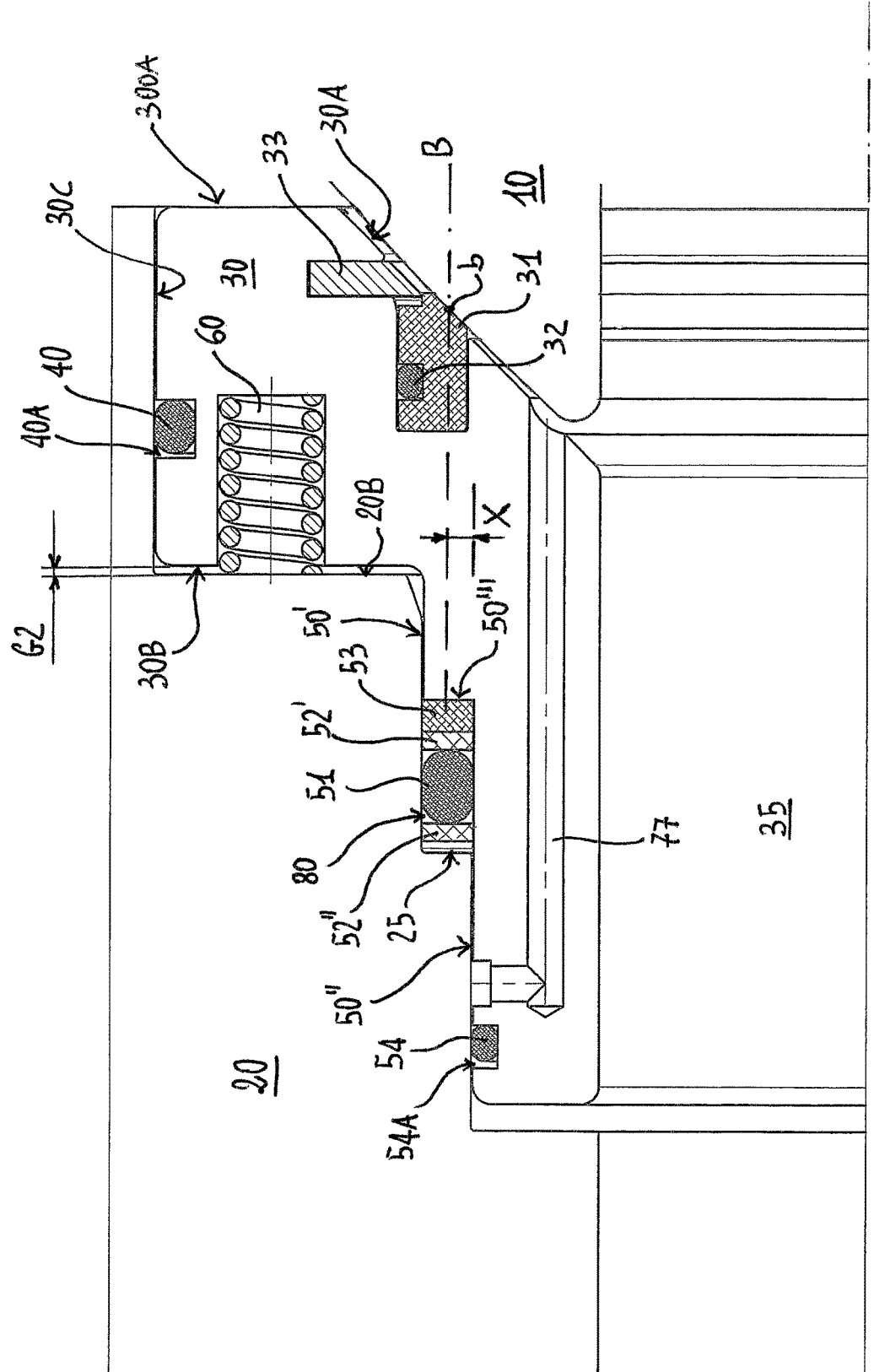
FIG. 2 is a cross section view taken along a radial section of a ball valve of SPE (Single Piston Effect) type, on which a first possible embodiment of the sealing assembly according to the present invention is installed.

The sealing assembly 101 comprises a sealing element 31, made of thermoplastic material, and accommodated within the first housing 31A (as shown in FIGS. 1 and 2) to achieve the sealing between the seat 30 and the ball 10. Such a sealing element 31 is thus ring-shaped to be inserted in the first housing 31A. The sealing element 31 is preferably made of PTFE (with various composites), PA, PEEK, POM, PCTFE and similar high-hardness thermoplastic polymers in order to achieve the fluid pressure sealing between seat 30 and ball 10.

According to the present invention, the sealing element 31 is accommodated with radial clearance in the first housing 31A so as to float, with respect to the seat 30, in the first housing 31A itself. In particular, the word "floating" means the possibility conferred to the sealing element 31 to move along a direction parallel to the central axis A when the seat 30 is installed in the valve body 20 and internally crossed by the pressurized fluid at the same time. The expression "radial clearance" means a condition in which the area of the cross section of the sealing element 31, evaluated with respect to a plane orthogonal to the central axis A, is smaller than the cross section area of the first housing 31A, evaluated on the same plane.

In this regard, according to a possible, but not exclusive embodiment, the cross section area of the first housing 31A is from 1% to 5% greater than the cross section area of the sealing element 31. Preferably, but not exclusively, the cross section area of said first housing 31A is from 1% to 3% greater than the cross section area of the sealing element 31.

Figure 5:
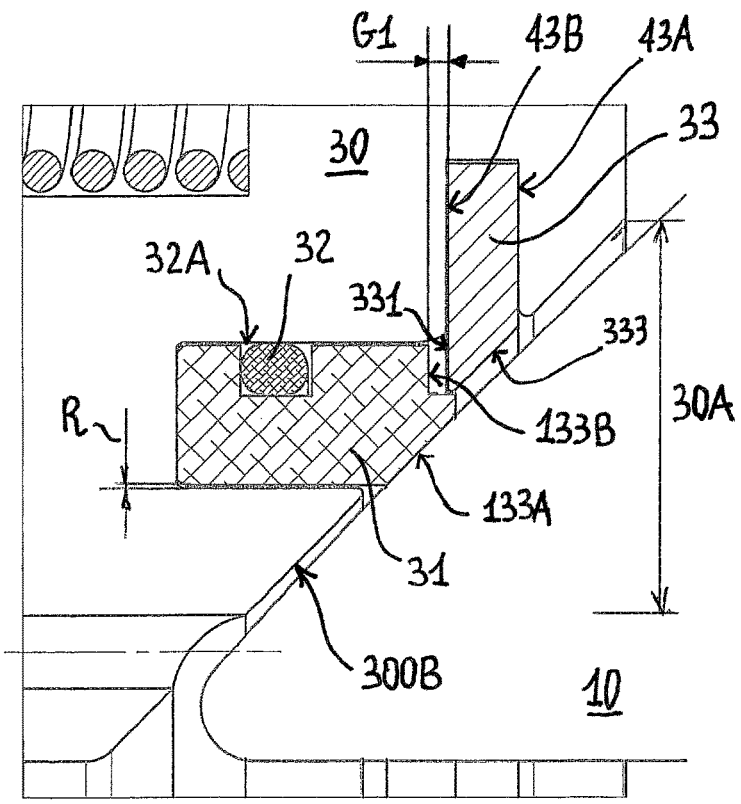
FIGS. 5 and 6 are enlargements of a sealing assembly in FIG. 2.
Figure 6:
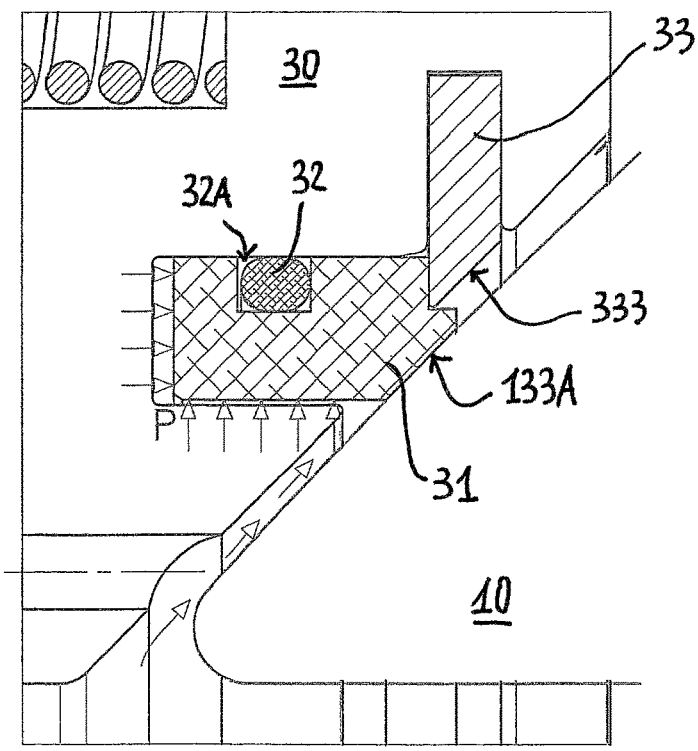

With reference to FIGS. 5 and 6, the principle is described by means of which the sealing is obtained by the sealing element 31. In FIG. 5, the sealing element 31 is inserted in the first housing 31A with radial clearance, indicated by reference R, and the seat 30 is not crossed by pressurized fluid. In FIG. 6, the radial clearance R is enlarged for illustration only.

In the condition in FIG. 6, the seat 30 is internally crossed by the pressurized fluid. The seat 30 is pushed towards the ball 10 by effect of the elastic means and of the pressure which acts on the rear surfaces 30B,50" of the seat 30, according to principles which will described below in greater detail. At the same time, the pressurized fluid moves up the gap existing between the ball 10 and the front surface 30A of the seat 30 and insinuates into the first seat 31A by effect of the radial clearance R. By virtue of the closed bottom surface 310 of the first seat 31A, the sealing element 30 is pushed by the pressure P of the fluid towards the ball 10 thus achieving the fluid sealing.

The thermoplastic sealing element 31 is pushed against the ball 10 directly by the pressure P of the fluid without the need for any external energizing system. In this sense, the sealing element 31 may be considered "self-floating" in axial direction. Furthermore, the sealing advantageously increases as the fluid pressure increases because the thrust applied by the pressure on the sealing element 31 increases. At the same time, although the stiffness of the sealing element 31 is higher than that of an elastomeric element, by virtue of the bias of the pressure force which thrusts the sealing element 31 towards the ball 10, the sealing is optimized also at the low pressures with all the advantages in terms of resistance to wear deriving from the hardness of the thermoplastic material.

According to another aspect of the present invention, the seat 30 comprises anti-extrusion means to avoid the release of the sealing element 31 during the step of opening the valve 1. In this step, by effect of the geometry of the seat-ball system and by effect of the passage 12 defined through the ball 10, two portions of the sealing element 31, opposite with respect to the central axis A, are not in contact with the surface of the ball 10. The "floating" condition would lead to the possible extrusion of the sealing element 31 at such opposite portions. The anti-extrusion means, by establishing a limit stop position to the axial movement of the sealing element 31 in the first housing 31A, thus avoid this possible drawback.

According to a preferred embodiment, the seat 30 comprises a second housing 33A at the front surface 30A; this second housing 33A also develops about the central axis A and is open towards the ball 10. In this embodiment, the anti-extrusion means comprise an anti-extrusion ring 33 (hereinafter also indicated as front ring 33) accommodated in the second housing 33A and which emerges with respect to said front surface 30A so as to define a limit position to the floating movement of the sealing element 31. The anti-extrusion ring 33 is preferably made of metal material and is preferably of open type, i.e. comprises two adjacent ends. The "open" configuration of the ring 33 promotes the insertion in the second housing 33A, which thus may occur with clearance. The adjacent ends of the ring 33 in open form are connected to the seat 30 by means of pins (not shown in the figures), which are inserted in specific passages (also not shown in the figures), which develop from a portion of the front surface 30A to the second housing 33A. The anti-extrusion ring 33 emerges with respect to the front surface 30A without coming into contact with the ball 10 of the valve 20. In some applications, in which the working pressure is relatively low, the anti-extrusion ring 33 could also be made of PEEK or other material having similar features.

Figure 4:
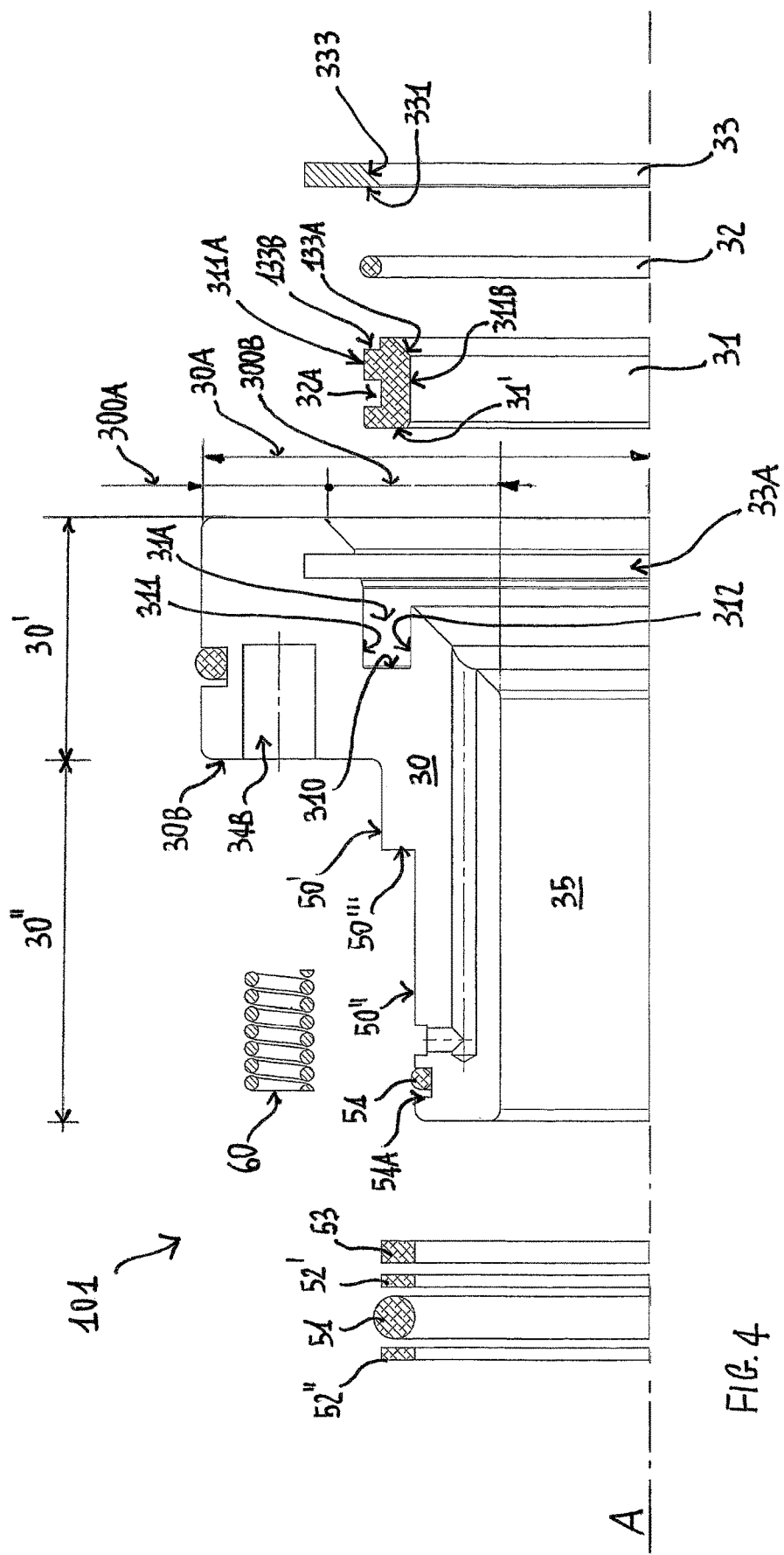
FIG. 4 is an exploded view of the sealing assembly in FIG. 2.

FIG. 4 allows to observe in detail the shape of the elements which form the sealing assembly 101 according to the invention. The first housing 31A is defined by an outer cylinder surface 311 and by an inner cylindrical surface 312 coaxial about the central axis A. Such cylindrical surfaces 311,312 respectively face an outer surface 311A and inner surface 311B of said sealing element 31. In closed valve conditions, the outer cylindrical surface 311A of the sealing element 31 abuts against/is in contact with the inner surface 311 of the first seat 31A by effect of the fluid pressure. Preferably, the first housing 31A is predominantly developed along the axial direction, i.e. parallel to the central axis A. This means that the extension of the first housing 31A, measured along the axial direction, is greater than the distance, measured along the radial direction orthogonal to the central axis A, between the outer cylindrical surface 311 and the inner cylindrical surface 312 defining the first housing itself.

According to a preferred embodiment, the sealing element 31 defines a circular seat 32A at the outer surface 311A in which a sealing ring 32 is accommodated. Substantially, the latter defines a supplementary sealing about the sealing element 31 and more precisely between the outer cylindrical surface 311A of the sealing element 31 and the outer cylindrical surface 311 of the first housing 31A. Substantially, the sealing ring 32 prevents the pressure from getting around the sealing element 31 being released from the first housing 31A over the position in which the sealing element 31 comes into contact with the ball 10.

The circular housing 32A can be defined by a groove which develops in the sealing element 31, in intermediate position between the front surface and the rear surface 31' of the sealing element 31 (such surfaces are defined hereinafter) as shown, for example, in the embodiment in FIGS. 2 and 3. Alternatively, the circular housing 32A may be defined by a shoulder obtained at the rear surface 31' of the sealing element 31, as shown in the embodiments in the figures from 8 to 13.

According to a possible embodiment, the sealing ring 32 is defined by an O-ring, preferably made of elastomeric material. Alternatively, a U-shape ring seal or a lip-seal (simple or double) type seal may be inserted in the circular housing 32A according to solutions described in greater detail below.

With reference again to the exploded view in FIG. 4, the sealing element 31 comprises a front surface which faces towards said ball 10 when said seat 30 is installed in said valve body 20 and a rear surface 31' which faces the closed bottom surface 310 of said first housing 31A. Preferably, the rear surface 31' develops orthogonally to the central axis A, i.e. to the cylindrical surfaces 311A,311B of the sealing element 31. According to a first possible embodiment shown in figures from 2 to 6, the rear surface 31' develops on a single plane orthogonal to the central axis A.

The front surface of the sealing ring 31 comprises a first portion 133A, inclined with respect to said central axis A to come into contact with the ball 10 and achieve the sealing in the presence of pressurized fluid in the seat 30. The front surface also comprises a second portion 133B on which the anti-extrusion means act following the axial displacement (floating) of the sealing element 31 due to the pressure force.

In this regard, according to a preferred embodiment, the second housing 33A is defined by two main surfaces 43A, 43B (indicated in FIG. 5) which develop on radial planes, orthogonal to the central axis A, mutually spaced apart. In particular, the second housing 33A has a predominantly radial extension, this indicating a condition such that the extension of the first housing 33A, measured along a radial direction, orthogonal to the central axis A, is greater than the distance, measured along a direction parallel to the central axis A, between the parallel planes on which the main surfaces 43A,43B defining the housing 33A itself, develop.

Preferably, the anti-extrusion ring 33 has a substantially trapezoidal section in which said section is evaluated on a radial plane related to said central axis A; in particular, the anti-extrusion ring 33 is installed so that the inclined surface 333 of the trapezoidal section faces towards the ball 10. The front ring 33 defines an abutment surface 331 which emerges in a position facing and spaced apart from the second portion 133B of the front surface 133 of the sealing element 31. The word "spaced apart" indicates a condition, evaluated in the absence of pressurized fluid, such that a gap (indicated with G1 in FIG. 5) is defined between the abutment surface 331 and the second portion 133B, which gap allows, in the presence of the pressurized fluid, the axial (floating) movement of the sealing element 31 towards the ball 10. Such an axial movement stops when the second portion 133B of the sealing element 31 come into contact with the abutment surface 331 of the front ring 33.

According to another aspect of the present invention, the front surface 30A of the seat 30 has a profile substantially complementary to that of the outer surface of the ball 10. With reference again to FIG. 4, the front surface 30A thus has a first portion 300A substantially perpendicular to the central axis A and a second portion 300B inclined with respect to the same central axis A to be complementary with the profile of the ball 10. From such a second portion 300B, the sealing element 31 and the front ring 33 emerge according to the principles disclosed above.

As a whole, the seat 30 comprises a front portion 30', which develops between the front surface 30A, and a rear surface 30B, opposite to the front surface 30A, which faces the valve body 20. The seat 30 comprises one or more rear housings 34B which develop from the surface 30B. Elastic means 60 are accommodated in such housings, one side of the means acting on the valve body 20 and on the other on the seat 30, so as to push the latter towards the ball 10, defining a gap, hereinafter indicated as gap G2 (see FIG. 2), between the rear surface 30B and the surface 20B of the valve body 20, facing the rear surface 30B itself. In particular, the gap G2 is established to be smaller than the gap G1*l* defined between the abutment surface 331 of the anti-extrusion ring 33 and the second portion 133B of the sealing element 31 defined above. The condition G1>G2 advantageously allows the recovery of the elastic deformation to which the ball 10 is subjected in the presence of pressure. In other words, by means of this condition, the sealing element 31 is provided with the axial stroke sufficient to ensure the sealing against the ball 10 also in the presence of elastic deformation thereon.

According to another aspect, the front portion 30' of the seat 30 further comprises a cylindrical outer surface 30C, which develops parallel to the central axis A between said front surface 30A and the rear surface 30B; the seat 30 further comprises a recess 40A which develops from the outer surface 30C in which a further central sealing ring 40 can be accommodated, which preferably, but not exclusively consists of an O-ring made of elastomeric material (or alternatively an elastomeric lip seal). As shown in greater detail below, in a first embodiment, the sealing assembly comprises a central sealing ring 40 accommodated in the recess 40A to configure a SPE type valve. In an alternative embodiment, the sealing assembly does not comprise said central sealing ring 40 to configure a DPE type valve.

The seat 30 also comprises a rear portion 30", which extends from the rear surface 30B of the front portion 30'. The rear portion 30" comprises a first cylindrical outer surface 50', which develops from said rear surface 30B, parallel to the central axis A and which displays a radial extension (i.e. evaluated according to a direction orthogonal to the central axis A) smaller than that of the outer surface 30C of the front portion 30'. The rear portion 30" of the seat 30 further comprises a second cylindrical outer surface 50" which develops parallel to the central axis A displaying a radial extension, again evaluated from the central axis A, smaller than that of the first outer surface 50'. The two surfaces 50',50" of the rear portion 50 are connected by a shoulder surface 50''', which develops on a transversal plane orthogonal to the central axis A. When the seat 30 is installed in the valve body 20, the second cylindrical surface 50" and the shoulder surface 50''' configure, with the valve body 20, a rear housing 80, in which rear ring-shaped sealing means 51,52',52",53 are accommodated. In particular, such a rear housing 80 is delimited on the front by the shoulder surface 50''' and behind by a surface 25 of the valve body 20 facing the shoulder surface 50''' itself.

The rear sealing means (51,52',52",53) ensure the rear sealing between the seat 30 and the valve body 20. In a possible embodiment, the rear sealing means comprise a first ring-shaped rear seal 51, a first anti-extrusion rear seal 52' and a second anti-extrusion rear seal 52" arranged on opposite parts with respect to the first rear ring seal 51 to prevent the release from the rear housing 80. Preferably, the rear sealing means also comprise a ring-shaped graphite seal 53 accommodated in the rear housing 80 between the first anti-extrusion rear seal 52' and the shoulder surface 50'''. Such a graphite seal 53 is adapted to perform the fire save function.

According to a further aspect, the rear part 30" of the seat 30 may comprise a further recess 54A, which may develop from the second cylindrical surface 50" to accommodate a further sealing ring 54, preferably an elastomer O-ring or an elastomeric lip seal, also provided as grease seal in the presence of lubrication. For this purpose, a channel 77 is obtained in the seat 30 for feeding grease. Such a channel 77 is developed between said second surface 50" of the rear portion 30' and the second portion 300B of the front surface 30A. Such a channel 77 is defined by two communicating holes, one of which is defined in axial sense and the other in radial sense, according to a solution known per se in the field.

As mentioned above, the sealing assembly 101 for ball valves according to the present invention is interchangeable, i.e. capable of performing the sealing function in Double Piston Effect DPE valves or to perform the "self relieving" function in Single Piston Effect SPE valves, respectively, and simply by eliminating the central sealing ring 40 in the recess 40A or including the presence thereof.

In this regard, FIG. 2 shows the sealing assembly comprising the sealing ring 40 in the recess 40A, which ensures the "self relieving" operation in Single Piston Effect (SPE) during the step of closing the valve or in case of lack of sealing of the first sealing assembly of the valve which operates upstream of the ball 10 with respect to the working fluid flow.

According to a further visible aspect, in FIG. 2, reference b indicates the sealing point of the sealing element 31, while reference B indicates a reference axis passing through the sealing point b and parallel to the central axis A. Again in FIG. 2, a part of the front surface 30A of the seat 30 over the axis B may thus be identified, which may be concerned by the fluid pressure, e.g. in case of lack of sealing of the system upstream of the ball 10. In closed valve condition, the sealing element 31 achieves the sealing of the ball 10. Therefore, the fluid does not pass beyond point b, thus striking the surface of the seat 30 over axis B. In the presence of the central ring 40 in the recess 40A, the fluid does not pass beyond the central ring 40 and the seat 30 behaves as a "self relieving", i.e. automatically opening, seat. Indeed, when the fluid pressure overcomes the resistance force of the elastic means 60, the seat 30 moves away from the ball 10 and the pressure is relieved downstream of the ball.

On the contrary, in the absence of the central ring in the recess 40A, the fluid goes beyond the recess itself and insinuates between the rear surface 30B of the seat 30 and the valve body 20 in the region in which the elastic means 60 are arranged. The fluid continues until meeting the rear sealing means (51,52',52"), and more specifically the rear ring seal 51, which achieves the rear sealing between the seat 30 and the valve body 20. The fluid further advances into the rear housing 80, and pushes the rear ring seal 51 from behind, which thereby achieves the rear sealing. At the same time, the fluid exerts a pressure on the shoulder surface 50''', which frontally closes the housing 80 in which the rear sealing means are arranged. The pressure on the shoulder surface 50''' translates into a corresponding thrust on the seat 30 towards the ball 10.

As a whole, the pressure force which acts against the seat 30, by pushing it away from the ball 10, is given by the pressure which acts on the frontal part 30A of the seat 20 over the axis B (front thrust surface). On the other hand, on the seat 30 a counter-pressure is exerted which pushes against the ball 10 determined by the pressure of the rear surface 30B and on the shoulder surface 50'''. The overall rear thrust surface of the seat 30 on which said "counter-pressure" acts (sum of the surfaces 30B and 50''') is greater than the part of the front surface 30A over axis B on which the pressure tending to move the seat 30 away from the ball 10 acts. The difference is shown by the surface region 50''' indicated, in FIGS. 2 and 3 by reference X, under axis B.

Such a difference thus determines an imbalance of forces following which the seat 30, and in particular the element 31, is kept against the ball 10. Therefore, the pressurized fluid deriving from a lack of sealing of the system upstream of the ball 10 is retained on the front by the sealing element 31 and behind from the rear sealing elements, thus without releasing downstream from the ball 10. So, in this case, the valve 1 assumes the "Double Piston Effect" DPE behavior.

In particular, it has been seen that the sealing assembly according to the present invention, and in particular the respective seat 30, is interchangeable because it can perform the "Single Piston Effect" SPE or "Double Piston Effect" DPE function simply by either providing or eliminating a seal, the central sealing ring 40 in the recess 40A, keeping all other shape and size features and sealing elements unchanged.

The sealing assembly according to the invention thus allows the valve manufacturer to make a single type of valve (with valve body configured so as to accommodate the seat 30 of the sealing assembly 1, as described above, and shown in the accompanying figures), thus advantageously providing the same valve for different types of use, simply by including, at the moment of assembling, the insertion of a sealing assembly according to the present invention with the corresponding configuration, i.e. with the presence of the first sealing ring 40 in the recess 40A or not. Thereby, the valve manufacturer is no longer forced to manufacture and have different valve types on stock for use in different seats, and at the same time may have a lower number of seats on stock, because the same seat may be used to manufacture SPE valves or to manufacture DPE valves.

Figure 3:
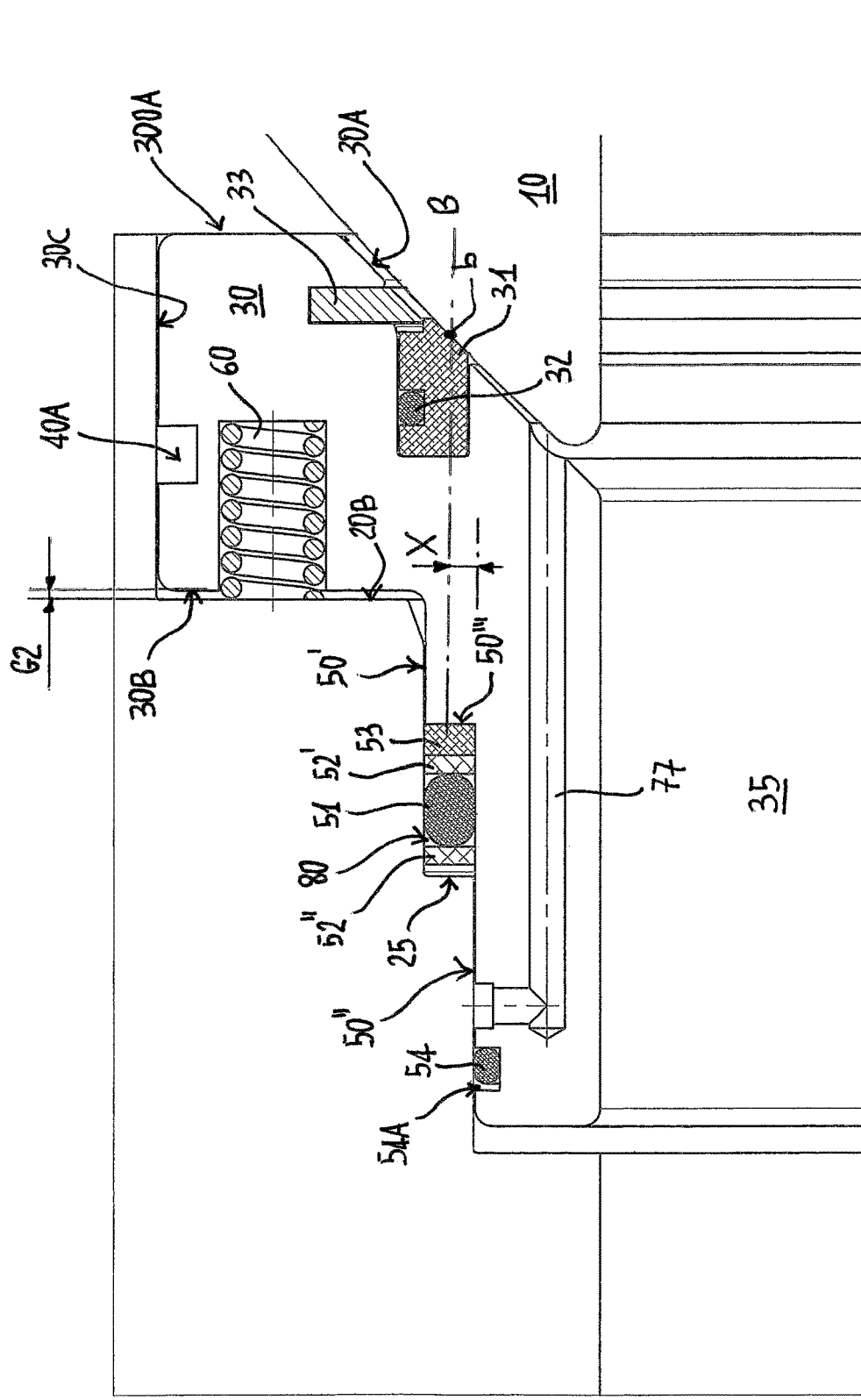
FIG. 3 is a cross section view taken along a radial section of a ball valve of DPE (Double Piston Effect) type, on which an embodiment of the sealing assembly according to the present invention, alternative to the one shown in FIG. 2, is installed.
Figure 7:
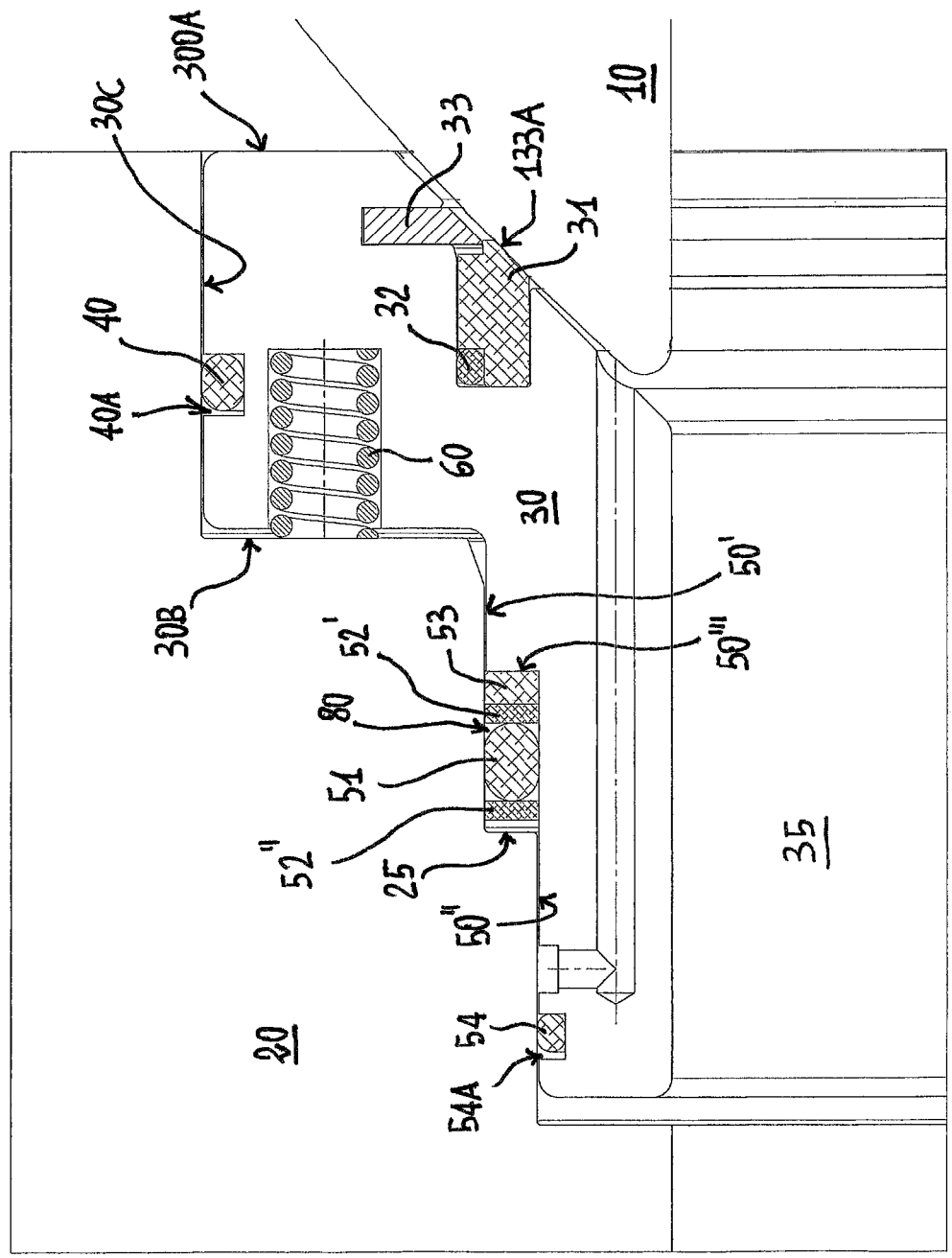
FIGS. 7 and 8 are a view taken according to a radial section and a detail view of a ball valve of SPE type, on which a second possible embodiment of the sealing assembly according to the present invention is installed, respectively.
Figure 8:
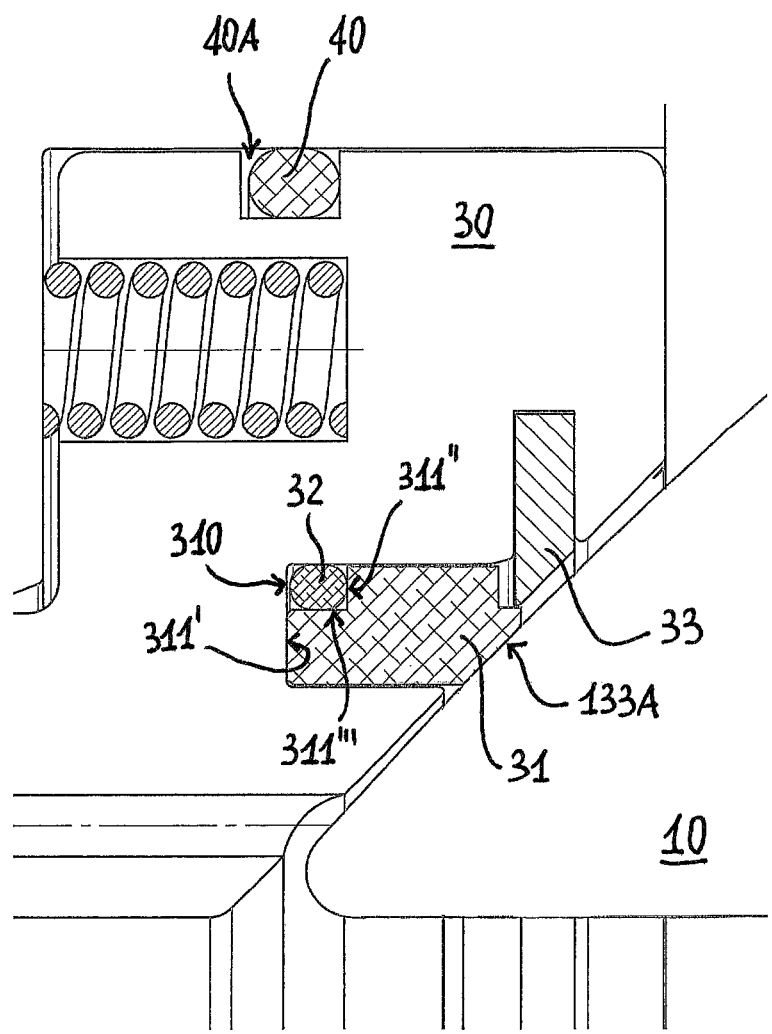

FIGS. 7 and 8 related to a SPE type valve in which the sealing assembly according to the invention differs from that in FIGS. 2 and 3 only for a different configuration of the sealing element 31. Indeed, in this embodiment, the rear surface 31' of the sealing ring 31 comprises two portions 311', 311" which are developed on spaced apart and parallel planes orthogonal to the central axis A. The rear surface 31' also comprises a cylindrical surface 311''' which develops between the two parallel portions 311',311". As a whole, in this embodiment, the portions 311',311",311" ' of the rear surface 31' configure a shoulder, i.e. a housing 32A for the sealing ring 32. In the embodiment shown in Figure from 7 to 9, the sealing ring 32 assumes the shape of an O-ring made of elastomeric material.

Figure 9:
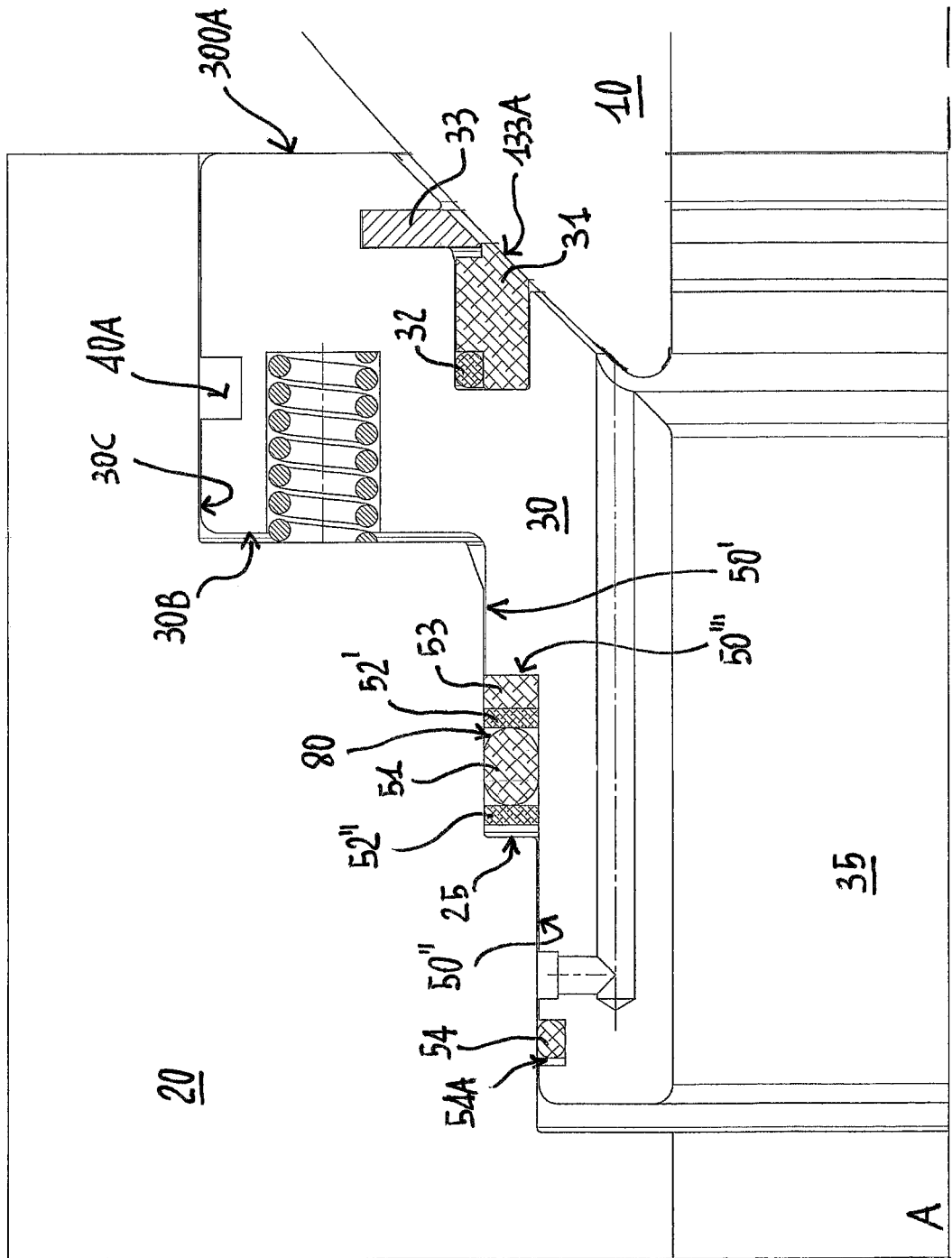
FIG. 9 is a radial section view of a ball valve of DPE (Double Piston Effect) type, on which a sealing assembly according to the present invention in an alternative embodiment to the one shown in FIG. 7 is installed.

FIG. 9 relates to a DPE type valve in which the sealing assembly differs from that shown in FIGS. 7 and 8 only for the lack of the central ring 40 in the recess 40A. This is in order to ensure the operation according to the second principle required by the DPE valve.

Figure 10:
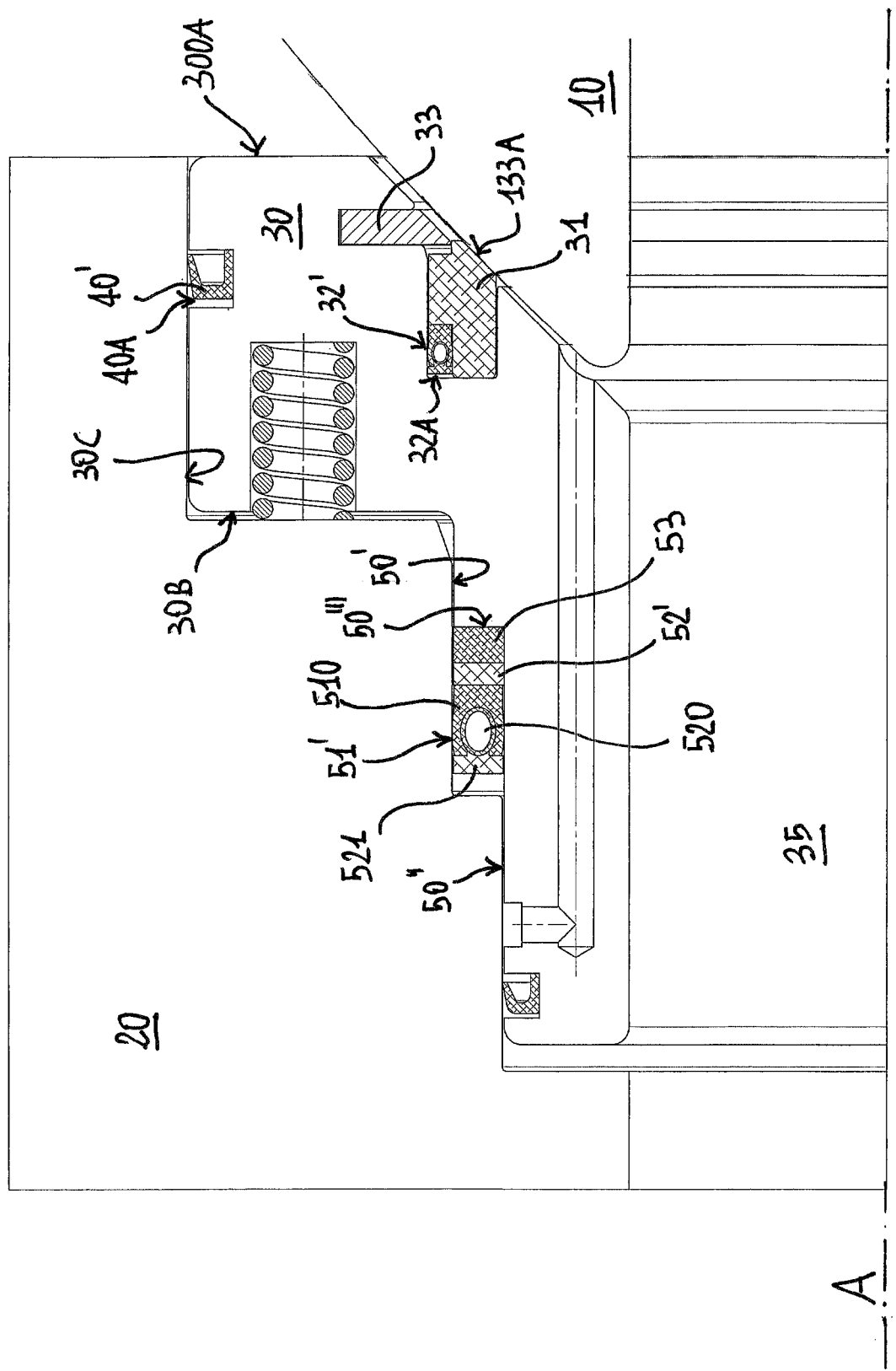
FIGS. 10 and 11 are a view taken according to a radial section and a detail view of a ball valve of SPE type on which a third possible embodiment of the sealing assembly according to the present invention is installed, respectively.
Figure 11:
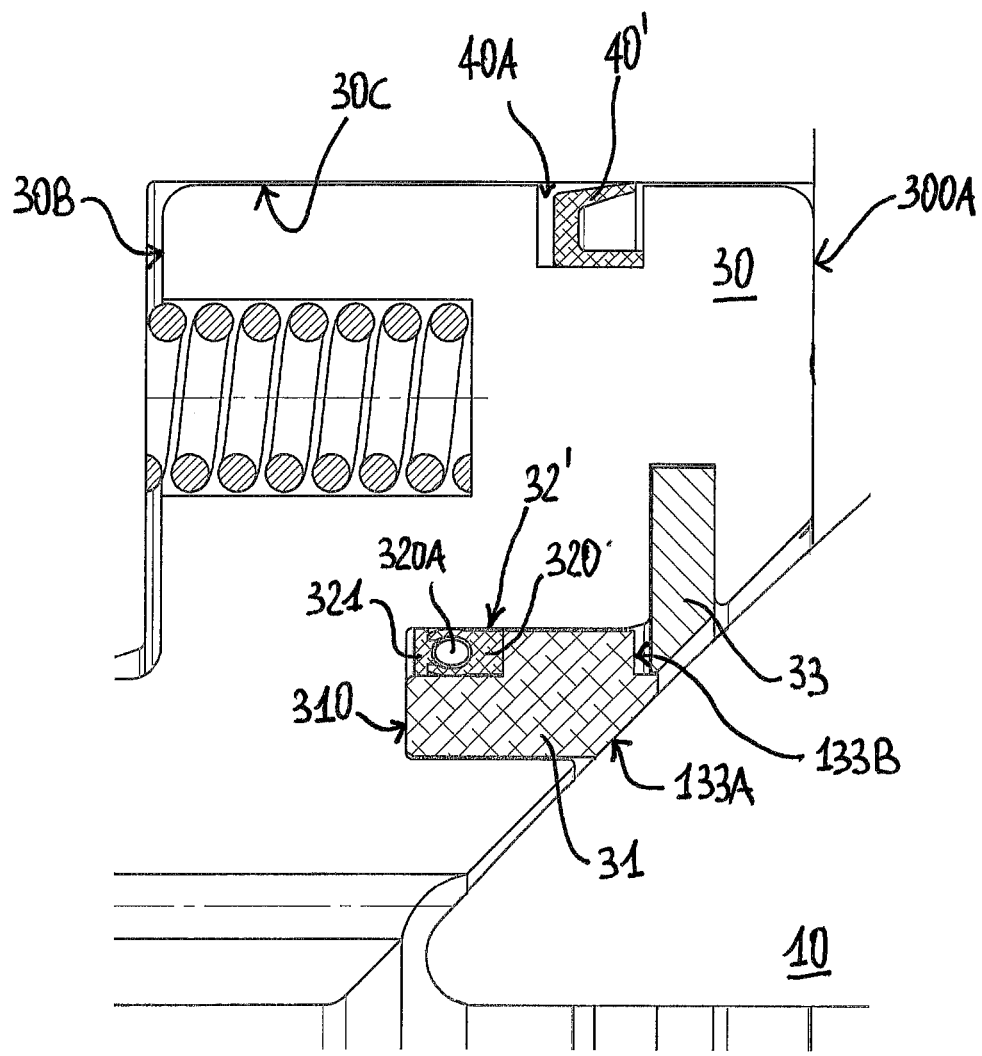

FIGS. 10 and 11 relate to another SPE type valve, in which the sealing assembly according to the invention differs from that in FIGS. 7 and 8 for a different configuration of some sealing elements. In particular, in this embodiment, the central sealing ring (indicated by reference numeral 40') provided in the recess 40A of the front part 30' of the seat 30, such as the sealing ring (indicated with reference 54') (grease seal) inserted in the recess 54A, consists of a U-shaped ring seal.

In the embodiment shown in FIGS. 10 and 11, the sealing ring (indicated by reference numeral 32') is inserted in the recess 32A defined by the sealing element 31 is a lip-seal ring made of thermoplastic material. With reference in particular to FIG. 11, this expression indicates a seal formed by a ring-shaped body 320 the section of which (evaluated according to a radial cross plane passing through the central axis A) is U-shaped. The ring 320 is inserted in the housing 32A so that the two opposite parts of the U are arranged parallel to the central axis A. A spring 320A also ring-shaped is arranged in the ring 320. Such a ring 320A has the purpose of energizing the ring-shaped element so as to ensure the contact of the opposite parts of the U against the corresponding cylindrical surfaces of the recess 32A also in case of relatively contained pressure. The lip-seal type ring 32' further comprises a containing element 321 (back pressure) which is inserted in the ring 320 (on the opposite side of the U) in order to contain the spring 320A. When the seat 30 is crossed by the pressurized fluid, the surface of the containing element 321 facing the rear surface 310 of the recess 31A undergoes a thrust deriving from the fluid pressure itself. Such a thrust is transmitted to the sealing element 31 to achieve the floating movement in the recess 31A according to the principles expressed above.

Again with reference to FIG. 10, in the latter embodiment the rear sealing ring (indicated by 51') is of the lip-seal type and has a shape similar to that described for the sealing ring 32'. In particular, the sealing rear ring 51' has a ring-shaped body 510, an inner spring 520 and a containing element 521. In all cases, in the embodiment in FIG. 10, the rear sealing means comprise an anti-extrusion ring 52' and a graphite ring 53 arranged between the rear sealing ring 51' and the shoulder surface 50''' of the seat 30. With respect the embodiment shown in figures from 1 to 4, in the embodiment of FIG. 10 no anti-extrusion ring is provided between the rear sealing ring and the surface 25 of the valve body 20.

Figure 12:
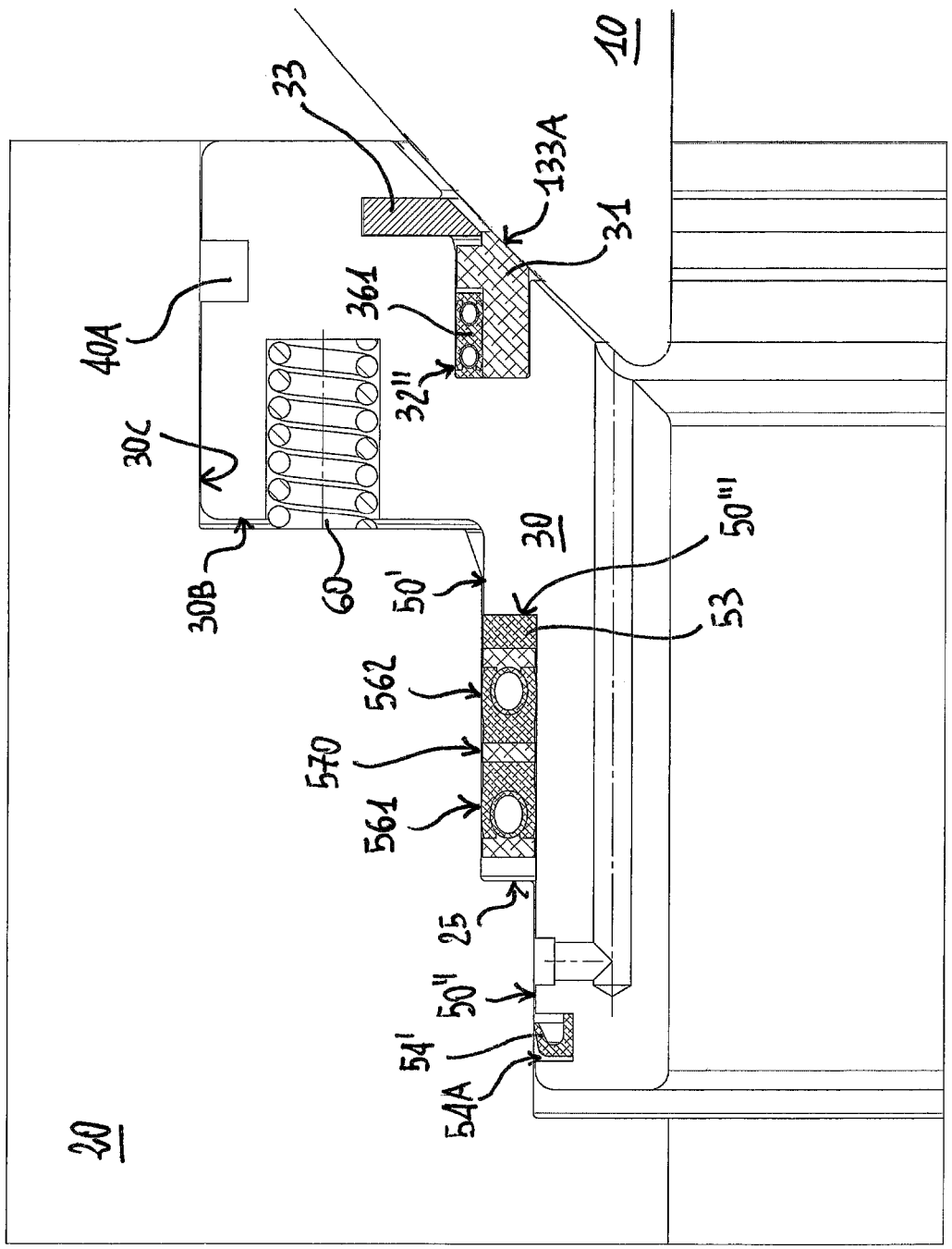
FIGS. 12 and 13 are a view taken according to a radial section and a detail view of a ball valve of DPE (Double Piston Effect) type, on which a further possible embodiment of the sealing assembly according to the present invention is installed, respectively.
Figure 13:
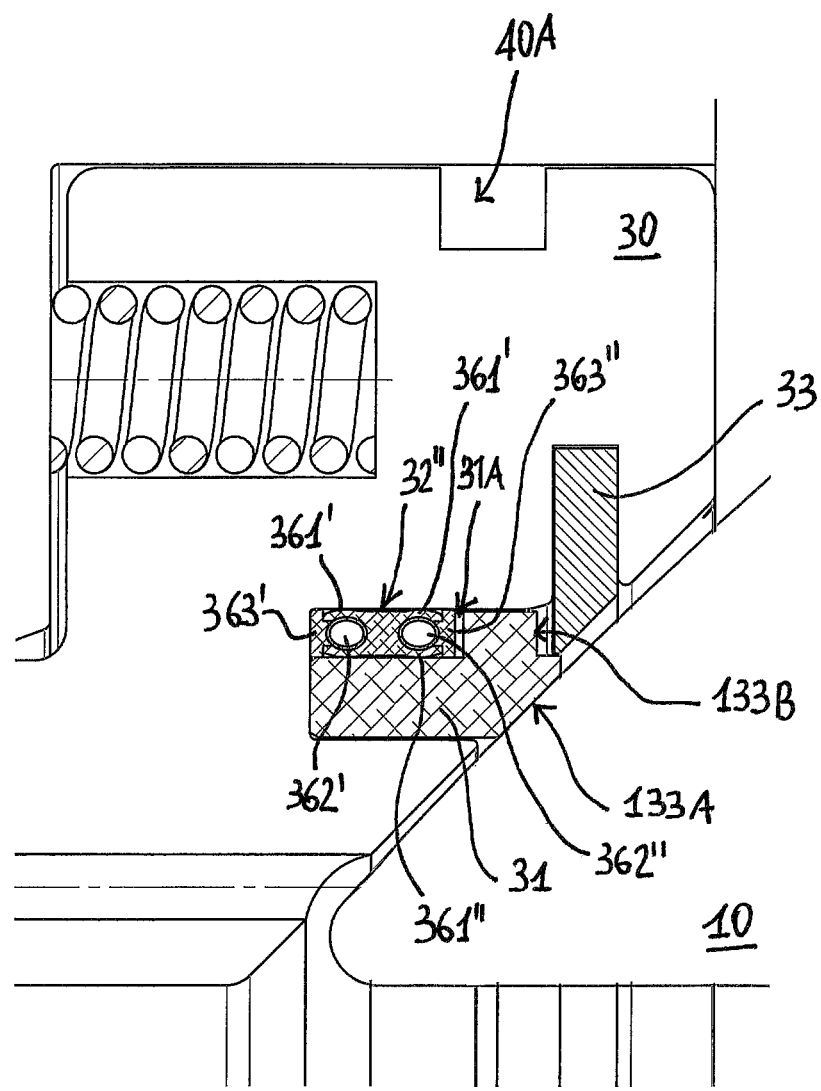

FIGS. 12 and 13 relate to another valve of DPE type, which differs from the other embodiments for a different conformation of some sealing elements. In particular, in this case in the recess 32A defined by the sealing element 31 and the first housing 31A is inserted a sealing ring (indicated with reference numeral 32") of the "double lip-seal" type. Substantially, this sealing ring 32" may be seen as the whole of two opposite lip-seal rings. In particular, the sealing ring 32" comprises a ring 361 made of thermoplastic material which defines two opposite U-shaped parts 361',361", in each of which a ring-shaped spring 362',362" is inserted. For each part 361',361" a containing element 363',363" is included for containing the corresponding ring-shaped spring 362',362".

In the embodiment shown in FIGS. 12 and 13, the rear sealing means comprise two "lip-seal" type seals (indicated by reference numerals 561, 562) between which an anti-extrusion ring seal (indicated by reference numeral 570) is provided. Preferably, a graphite sealing ring 53 may be provided.

With reference to the embodiments shown in the Figures from 10 to 13, the use of the lip-seal or double lip-seal rings made of thermoplastic material allow applications at temperatures which could be prohibitive for an elastomeric material (e.g. rubber). At the same time, the chemical inertia of the thermoplastic material allows applications which cannot be achieved with rubber or other elastomeric materials.

The sealing elements applied to the front part 30' and the rear part 30" of the seat 30 could have different shapes and combinations from those described above and shown in the figures. In all cases, such combinations are always possible without any variation of the structure of the seat 30, which defines the housings for the various elements. This is in accordance with the interchangeability of the sealing assembly according to the present invention.

The invention claimed is:

1. A sealing assembly for an industrial ball valve, wherein said valve comprises at least one valve body and a ball accommodated in said valve body, said sealing assembly comprising:
    at least one seat insertable in said valve body, said seat developing about a central axis and defining an axial cavity for the passage of a pressurized fluid, said seat comprising a first housing at a first front surface of said seat which faces towards said ball when said seat is installed in said valve body, said first housing comprising a closed bottom surface which develops on a plane transversal to said central axis;
    a sealing element, made of thermoplastic material, to achieve the fluid sealing between said seat and said ball of said valve, said sealing element being ring-shaped and accommodated within said first housing;
    characterized in that said sealing element is accommodated with radial clearance in said first housing to be floating with respect to said seat, along the direction parallel to said central axis when said seat is installed in said valve body and when said seat is internally crossed by said pressurized fluid, said sealing assembly comprising anti-extrusion means to avoid the extraction of said sealing element from said first housing during the step of opening said valve;
    wherein said first housing is defined by a first outer cylindrical surface and by an inner cylindrical surface towards which an outer surface and an inner surface of said sealing element respectively face, and wherein said sealing element defines a circular housing in which a sealing ring is accommodated to achieve the sealing between said outer surface of said first housing and said inner surface of said sealing element.

2. The sealing assembly according to claim 1, wherein said seat comprises a second housing at said front surface and which faces towards said ball when said seat is installed in said valve body, and wherein said anti-extrusion means comprise an anti-extrusion ring accommodated in said second housing which emerges with respect to said front surface so as to keep said sealing element in said first housing.

3. The sealing assembly according to claim 2, wherein said second housing has a predominantly radial extension and wherein said anti-extrusion ring has a substantially trapezoidal section, wherein said section is evaluated on a radial plane relative to said central axis, said anti-extrusion ring being installed so that the inclined face of said trapezoidal section faces towards said ball.

4. The sealing assembly according to claim 2, wherein said sealing element comprises a front surface which faces towards said ball when said seat is installed in said valve body and a rear surface which faces towards said bottom surface of said first housing, said front surface comprising a first portion inclined with respect to said central axis to achieve the sealing on said ball and a second portion, and wherein said anti-extrusion ring comprises an abutment surface which emerges in a position facing and spaced apart from said second portion.

5. The sealing assembly according to claim 1, wherein the cross section area of said first housing is from 1% to 5% greater than the cross section area of said sealing element, and wherein said cross sections are evaluated on a radial plane substantially orthogonal to said axial direction.

6. The sealing assembly according to claim 1, wherein the cross section area of said first housing is from 1% to 3% greater than the cross section area of said sealing element, and wherein said cross sections are evaluated on a radial plane substantially orthogonal to said axial direction.

7. The sealing assembly according to claim 1, wherein said sealing element is made of a material chosen from a group consisting of PEEK, PA, PTFE, POM, PCTFE.

8. The sealing assembly according to claim 1, wherein said seat comprises a front portion which develops between said front surface and a rear surface opposite to said front surface and which faces towards said valve body, said sealing assembly comprising elastic means which act on one side of said valve body and on the other of said seat so as to push said seat against said ball.

9. The sealing assembly according to claim 8, wherein said seat comprises an outer surface which develops parallel to said central axis between said front surface and said rear surface, said seat comprising a recess defined near said outer surface in which a further central sealing ring, preferably made of elastomeric material, is accommodated.

10. The sealing assembly, according to claim 9, wherein a sealing ring, preferably made of thermoplastic material, is accommodated in said recess.

11. The sealing assembly according to claim 8, wherein said seat comprises a rear portion which develops from said rear surface of said front portion, wherein said rear portion comprises:
a first cylindrical surface, which develops, from said rear surface of said front portion, parallel to said central axis and which has a radial extension smaller than that of said outer surface of said front portion;
a second cylindrical surface, which develops parallel to said central axis and which has a radial extension smaller than that of said first cylindrical surface of said rear portion;
a shoulder surface which develops between said cylindrical surface on a plane substantially orthogonal to said central axis, said shoulder surface and said second cylindrical surface defining a rear housing in which rear ring-shaped sealing means are accommodated, said housing being frontally closed by said shoulder surface.

12. The sealing assembly according to claim 11, wherein said sealing means comprise a first ring-shaped rear seal, a first anti-extrusion rear seal and a second anti-extrusion rear seal arranged on opposite sides of said ring-shaped seal to prevent the releasing of said rear ring-shaped seat from said rear housing.

13. The sealing assembly according to claim 11, wherein said sealing means comprise a graphite ring seal arranged between an anti-extrusion rear seal and said shoulder surface.

14. The sealing assembly according to claim 11, wherein said assembly comprises a graphite ring arranged in said rear housing.

15. The sealing assembly according to claim 1, wherein said sealing element achieves the sealing between said seat and said ball at a sealing point and wherein a reference axis passing through said sealing point and parallel to said central axis identifies a front thrust surface on a vertical plane passing through the central axis, the thrust surface defined by a portion of said front surface over said reference axis and a rear thrust surface comprising said rear surface and said shoulder surface, said rear thrust surface being greater than said front trust surface.

16. A ball valve characterized in that it comprises a sealing assembly according to claim 1.

17. The sealing assembly according to claim 1, wherein said sealing ring is inserted in said circular recess defined by said sealing element chosen from a group consisting of an O-ring type ring made of elastomeric material, a lip-seal type ring made of thermoplastic material, and a double lip-seal type ring made of thermoplastic material.

* * * * *